United States Patent [19]

Moto et al.

[11] 4,295,082
[45] Oct. 13, 1981

[54] PULSE WIDTH MODULATED SERVO CIRCUIT

[75] Inventors: Masato Moto; Seigo Ito, both of Mobara, Japan

[73] Assignee: Futaba Denshi Kogyo K.K., Mobara, Japan

[21] Appl. No.: 127,744

[22] Filed: Mar. 6, 1980

[30] Foreign Application Priority Data

Mar. 9, 1979 [JP] Japan .................................. 54-26767

[51] Int. Cl.³ .......................................... G05B 11/28
[52] U.S. Cl. .................................... 318/599; 318/596; 318/672
[58] Field of Search ........... 318/599, 596, 341, 345 A, 318/345 R, 672

[56] References Cited

U.S. PATENT DOCUMENTS 4,105,938 8/1978 Mathews, Jr. ...................... 318/599
4,223,258 9/1980 Lacy ..................................... 318/599

FOREIGN PATENT DOCUMENTS 2313801 12/1976 France ................................. 318/599

Primary Examiner—J. V. Truhe
Assistant Examiner—Eugene S. Indyk
Attorney, Agent, or Firm—Oblon, Fisher, Spivak, McClelland & Maier

[57] ABSTRACT

A motor servo circuit is disclosed. The motor in the motor servo circuit is driven by an output which is obtained by logically adding output pulses of a pulse stretcher circuit which stretches a pulse width of error pulses generated from an OR circuit when pulses inputted to the motor servo circuit and pulses outputted from a pulse generator in response to the input pulses are different in the pulse width to pulses having a predetermined pulse width which are generated at intervals of a predetermined member of the error pulses synchronizing therewith.

3 Claims, 12 Drawing Figures

POWER SOURCSE VOLTAGE

PULSE WIDTH MODULATED SERVO CIRCUIT

BACKGROUND OF THE INVENTION

1. Field of the Invention

This invention relates to a radio controlling device, and more particularly to a motor servo circuit used in the radio controlling device which is designed to improve control precision and to decrease power consumption.

2. Description of the Prior Art

A motor servo circit has been extensively used heretofore to control amount of movement in various objects to be controlled. For example, in a radio controlling device which remotely controls running objects, such as, for example, model air planes, model boats, or model cars, by an electromagnetic wave, a rotating angle and direction of servo motor in the motor servo circuit are controlled by the electromagnetic waves which are emitted from a transmitter and received by a receiver mounted on the objects to be controlled. The motor servo circuit in the radio controlling device is generally constructed as shown in FIG. 1.

The motor servo circuit includes an input terminal $t_1$ which receives a pulse S having a pulse width as shown in FIG. 2(a) corresponding to a controlled variable in an operating station after being received by the receiver (not shown) and subjected to shape its wave form. The pulse S is introduced into a pulse generator $MM_1$ for triggering and obtaining a single pulse M as shown in FIG. 2(b).

The pulse width of the pulse M shown in FIG. 2(b) is controlled in response to a resistance of a variable resistor VR having a fixed terminal to which a power source $+V$ is connected and a slider connected to a rotary shaft of motor which will be hereinafter described.

The input pulse S and the output pulse of the pulse generator $MM_1$ are fed to an exclusive OR circuit consisting of inverters $IN_1$, $IN_2$, NOR circuits $NR_1$, $NR_2$ and an OR circuit OR. When the width of the pulse S is greater than that of the pulse M, a pulse $e_1$ (hereinafter referred to as an error pulse) having width corresponding to the difference between the widths of two pulses S and M is generated at an output terminal of the NOR circuit $NR_1$ as shown in FIG. 2(c).

When the width of the pulse M is greater than that of the pulse S, an error pulse $e_2$ shown in FIG. 2(d) having width corresponding to the difference between the width of two pulses S and M is generated at an output terminal of the NOR circuit $NR_2$.

The error pulses $e_1$ and $e_2$ are fed to a set terminal S and a reset terminal R of flip-flop $FF_1$, respectively, to make either one of the output terminals Q or $\overline{Q}$ "1." At the same time, the error pulses $e_1$ and $e_2$ are fed to a pulse stretcher circuit PS through the OR circuit $OR_1$ wherein they are stretched in a predetermined ratio as shown in FIG. 2(e). An output pulse from the pulse stretcher circuit PS is introduced into a motor driving circuit PA by passing through either one of AND circuits $AD_1$ or $AD_2$ so that a motor MT may be rotated in a predetermined direction, thereby to move controls (not shown) in a predetermined value.

As explained hereinabove, the slider of the variable resistor VR is connected to the rotary shaft of the motor MT. Thus, the resistance of the variable resistor VR is subjected to change in accordance with the rotation of the motor MT. If the changing direction of the resistance of the variable resistor VR is set to the direction where the pulse width of the output pulse M of the pulse generator $MM_1$ is registered with that of the input pulse S, the resistance of the variable resistor VR is controlled extending over several cycles of the controlling waves which are received by the receiver. When the width of the input pulse S is registered with the width of the output pulse of the pulse generator $MM_1$, the OR circuit $OR_1$ stops generating the output which makes the revolution of the motor MT stop, thereby the control operation is achieved, for instance, by opening a throttle valve of an engine in response to the operation volume determined by the transmitting station.

In the radio controlling devices, a DC motor is mostly used as the motor MT. When the DC motor is energized by pulses, the average electric power supplied to the motor is increased by the application of the pulses having wider pulse width to the motor which results in the increase in the revolution speed. To the contrary, the revolution speed of the motor is decreased when the pulses having narrower pulse width are applied thereto, and the motor stops running when the pulse width of the applied pulses is narrower than a predetermined value. Under the condition, the motor does not rotate even if an electric current is running through the motor for driving, which makes it impossible to effect the controls in an appropriate position and consumes the electric power wastefully. When a battery is used as the power source, the battery is run out soon if the electric power is used in waste.

In order to prevent the battery from running out, the pulse stretcher circuit PS is usually constructed to include a transistor $Q_1$ which is added to an integrated circuit consisting of a resistor $R_s$ and a capacitor $C_s$, thereby to shape the wave forms by introducing an output of the capacitor $C_s$ into a Schmidt trigger circuit as shown in FIG. 3. When the error pulse e shown in FIG. 4(a) is fed to the base of the transistor $Q_1$, the transistor $Q_1$ is switched on so that the electric charge stored in the capacitor $C_s$ may be discharged as shown in FIG. 4(b), and then the capacitor $C_s$ is charged by current supplied through a resistor $R_s$ so as to be in equal to the power source $+V$. During the period of exceeding the terminal voltage of the capacitor $C_s$ at the time of discharging the capacitor $C_s$ beyond the discrimination level $VH_1$ shown in FIG. 4(b) and exceeding the terminal voltage of the capacitor $C_s$ at the time of subsequent charging the capacitor $C_s$ beyond the discrimination level $VH_2$ shown in FIG. 4(b), the Schmidt trigger circuit ST generates the pulse having the width corresponding to that of the error pulse e which is shaped as shown in FIG. 4(c) for driving the motor MT.

In this instance, the pulse width of the output pulse of the pulse stretcher circuit with respect to the error pulse e is determined by adjusting the value of time constant $C_s R_s$ in a time constant circuit which consists of the capacitor C and the resistor $R_s$. When the Schmidt circuit ST is used, which is capable of changing a positive feedback volume by adjusting a feedback resistor $R_f$ shown in FIG. 3, the minimum pulse width (hereinafter referred to as a minimum output pulse) fed to the motor MT through the driving circuit PA can be determined by adjusting the positive feedback volume so as to have such pulse width which does not cause a failure in starting the motor MT.

In recent years, the radio controlling devices have been diversified, and a variety of motors have been mounted on the objects which are subjected to the remote control.

In the motors used in the radio controlling devices, a starting voltage for motor is different in each type of the motors, and the motor having less number of poles is generally used to reduce the manufacturing cost of the running objects. The motor requiring a high starting voltage or having less number of poles does not start unless large average electric power is supplied therewith. Thus, it is necessary to set the pulse width of the minimum output pulse wider for driving such motor. In other words, the time constant determined by the capacitor $C_s$ and the resistor $R_s$ must be set to be larger. However, if the time constant is so large, the width of the output pulse of the pulse stretcher circuit $P_s$ is variable to a great extent in response to the change in the width of error pulse e as shown in FIG. 5, which results in the running of the motor MT at a full speed.

In FIG. 5, the pulse width of the error pulse e is shown in the abscissa, while the width of the output pulse of the pulse stretcher circuit $P_s$ is shown in the ordinate making the time constant $C_sR_s$ a parameter. As shown in FIG. 5, the pulse width of the minimum output pulse will be broader and the inclination of its characteristics curve will be steeper in accordance with the increase in the time constant $C_sR_s$ as shown in the broken lines (A), (B) and (C). As a result, the pulse width of the output pulse of the pulse stretcher circuit $P_s$ is easily saturated, thereby to make the motor MT rotate at the full speed.

In the radio controlling devices, the servo mechanism is required to have such characteristics that the motor can be quickly and precisely rotated in a predetermined position. Thus, even if the driving characteristics of the motor MT is improved by setting the time constant $C_sR_s$ larger as explained hereinabove, the requirements for the servo mechanism are not satisfied unless the motor MT stops exactly at the required position.

On the other hand, it is possible to conduct delicate control and to increase resolving power of the servo mechanism, if the revolution speed of the motor is decreased by applying the minimum output pulse having the narrower pulse width to the motor MT. Therefore, it is advantageous that the time constant $C_sR_s$ is as small as possible in terms of the increase in the resolving power.

As explained hereinabove, when determining the output pulse width of the pulse stretcher circuit $P_s$, both requirements for the driving characteristics of the motor MT and the resolving power must be satisfied at the same time, however, as a matter of fact, this is impossible.

Even if the width of the minimum output pulse is determined by taking both the driving characteristics of the motor and the resolving power into consideration, it is required to conduct the troublesome adjustment every time when the motor is changed, because there is the variety in the characteristics of the motors as explained hereinabove. The adjusting operation is actually too complicated to do, which creates such problems that the sufficient control precision is not obtainable or the consumption of the electric power due to the current flowing into the motor which does not participate in driving the motor is increased.

SUMMARY OF THE INVENTION

This invention is intended to eliminate the above-mentioned disadvantages of the prior art and to provide a novel motor servo circuit.

Therefore, it is an object of the present invention to provide a motor servo circuit which improves driving characteristics of motors and resolving power for control and eliminates waste of power consumption.

It is another object of the present invention to provide a motor servo circuit which is capable of setting width of minimum output pulse extremely small for enhancing resolving power and effecting a high precision control.

It is further object of the present invention to provide a motor servo circuit using a motor which includes less poles and starts at a relatively high voltage so as to be advantageously mounted on radio controlled running objects, such as, for example, model airplanes, model cars, model ships or the like.

According to the present invention, the foregoing and other objects are attained by providing a motor servo circuit which comprises a first pulse generator for generating pulses having a pulse width adjusted by external signals and synchronized with input pulses, a pulse width comparator for comparing output pulses from the first pulse generator with the pulse width of the input pulses and generating pulses having a pulse width corresponding to a difference in the pulse width of both of these pulses when the pulse widths are different, a pulse width stretcher for stretching an output of the pulse width comparator, a second pulse generator for generating pulses having a predetermined pulse width at intervals of the generation of the predetermined numbers of the output pulses of the pulse width comparator, an adder for performing an OR of the output pulses of the pulse width stretcher and the second pulse generator, and a motor for adjusting the output pulse width of the first pulse generator in accordance with the rotation angle of the motor which is driven by the output of the adder.

BRIEF DESCRIPTION OF THE DRAWINGS

Various other objects, features and attendant advantages of this invention will be readily appreciated as the same becomes better understood by reference to the following detailed description when considered in connection with the accompanying drawings in which like reference characters designate the same or similar parts throughout the figures thereof and wherein.

DESCRIPTION OF THE PREFERRED EMBODIMENTS

Now, the preferred embodiments of the present invention will be hereinafter described with reference to the accompanying drawings.

Figure 6:
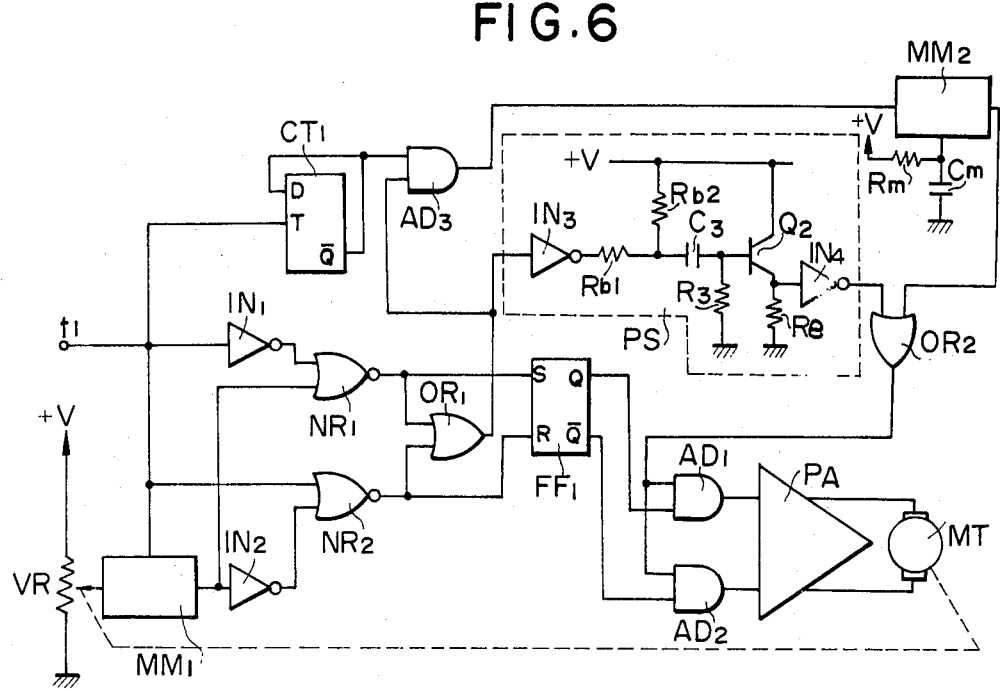
FIG. 6 is a block diagram showing a motor servo circuit according to an embodiment of the present invention.

Reference is now made to FIG. 6 which shows an example of the motor servo circuit according to the present invention. The motor servo circuit includes a binary counter $CT_1$ which feedbacks an output $\bar{Q}$ of the D-type flip-flop to the D input terminal and reverses its output state at intervals of each receipt of pulses at the T input terminal. The motor servo circuit further includes an AND circuit $AD_3$ which performs an AND-logic with respect to error pulses outputted from an OR circuit $OR_1$ and the output of the binary counter $CT_1$ and a pulse generator $MM_2$ which is triggered by output pulses of the AND circuit $AD_3$ and generates a single pulse having a predetermined pulse width. The width of the output pulse generated by the pulse generator $MM_2$ can be suitable determined by changing values of externally provided resistor Rm and capacitor Cm. An OR circuit $OR_2$ which performs an OR-logic with respect to the output of the pulse generator $MM_2$ and an output of pulse stretcher circuit PS is provided.

In the motor servo circuit according to the present invention, the pulse stretcher circuit PS does not include a Schmidt trigger circuit therein which is generally used in the conventional circuit. The pulse stretcher circuit PS in the motor servo circuit according to the present invention consists of an inverter $IN_3$ for inverting error pulses outputted from the OR circuit $OR_1$, a capacitor $C_3$ and a resistor $R_3$ for constituting a time constant circuit, biasing resistors $Rb_1$ and $Rb_2$, a transistor $Q_2$, an emitter resistor Re, and an inverter $IN_4$ as shown in FIG. 6.

Reference will now be made to the operation of the motor servo circuit according to the present invention which is constructed as explained hereinabove.

Figure 7:
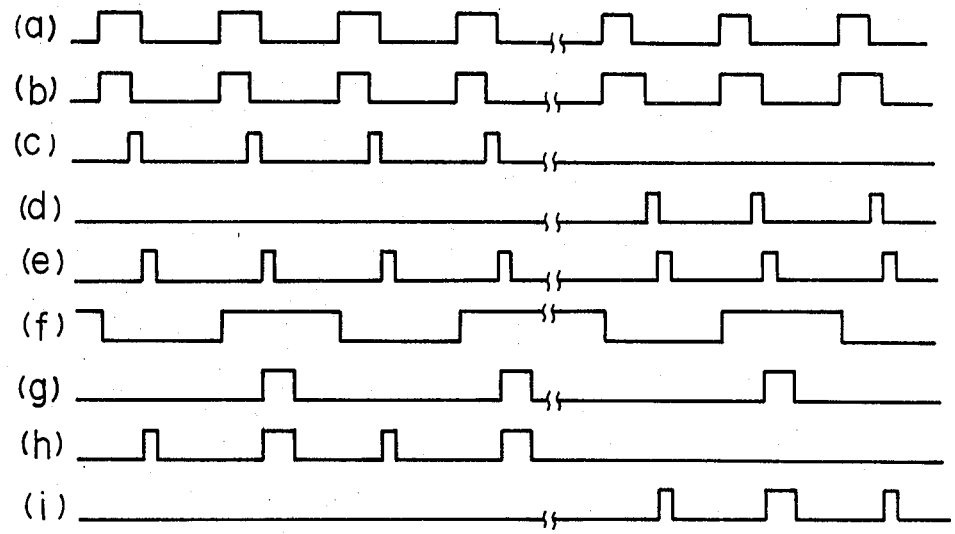
FIG. 7 is a timing chart for explaining the operation of the motor servo circuit according to the present invention.

First, when input pulses are fed to an input terminal $t_1$ as shown in FIG. 7($a$), the pulse length of the input pulses is compared with the pulse length of the input pulses shown in FIG. 7($b$) of the pulse generator $MM_1$ which is triggered by the input pulses, whereby error pulses are generated. When the pulse length of the input pulses given to the input terminal $t_1$ is broader than the pulse length formed by the pulse generator $MM_1$, pulses corresponding to the difference in the pulse length between these pulses as shown in FIG. 7($c$) are outputted to a NOR circuit $NR_1$, which are, in turn, outputted as error pulses through the OR circuit $OR_1$.

The input pulses are given to the T input terminal of the binary counter $CT_1$, and the output of the $\bar{Q}$ terminal of the binary counter $CT_1$ is inverted at intervals of each receipt of the input pulses as shown in FIG. 7($f$).

The output of the binary counter $CT_1$ and the error pulses are fed to the AND circuit. Thus, when the $\bar{Q}$ output of the binary counter $CT_1$ goes to a signal "1," the AND-logic is performed and the AND circuit $AD_3$ generates trigger pulses which are fed to the pulse generator $MM_2$. In response to the trigger pulses, the pulse generator $MM_2$ generates pulses having the pulse length which is determined by the values of the resistor Rm and the capacitor Cm as shown in FIG. 7($g$). As explained hereinabove, the output of the pulse generator $MM_2$ can be obtained only when the AND-logic is performed in the AND circuit $AD_3$, and it is outputted at intervals of each error pulse synchronizing therewith as shown in FIG. 7($g$).

The error pulses are also fed to the pulse stretcher circuit PS and the pulse length is stretched in the ratio determined by time constant $C_3R_3$ in the time constant circuit which consists of the capacitor $C_3$ and the resistor $R_3$. The pulse stretcher circuit does not include the Schmidt trigger circuit. Thus, it is responsive to pulses which are extremely short in the pulse length. In other words, when the error pulses are given to the pulse stretcher circuit PS, the pulse stretcher circuit PS stretches the pulse length of the error pulses irrespective of the pulse length of the minimum output pulses with respect to the motor MT and generates pulses to be fed to the OR circuit $OR_2$. The length of the output pulses of the pulse stretcher circuit PS with respective to the length of the error pulses is shown by the solid curve (D) in FIG. 5.

The output pulses of the NoR circuit $NR_1$ are fed to the S terminal of flip-flop $FF_1$. Accordingly, when the pulses are generated at the output terminal of the NoR circuit $NR_1$ as shown in FIG. 7($c$), the flip-flop $FF_1$ is set to be given a signal "1" to the $\bar{Q}$ terminal, thereby to open the AND circuit $AD_1$. The output of the OR circuit $OR_2$ is given to an AND circuit $AD_1$ which outputs pulses as shown in FIG. 7($h$) while the flip-flop $FF_1$ is set, namely, the pulses are outputted from the NoR circuit $NR_1$.

As explained hereinabove, the pulses shown in FIG. 7($h$) are consist of error pulses to which the output pulses of the pulse generator $MM_2$ shown in FIG. 7($g$) are added at intervals of each error pulse synchronizing therewith. The width of the output pulses of the pulse generator $MM_2$ is set to a minimum value which is sufficient to start the motor MT. Then, the output of the AND circuit $AD_1$ is given to the motor MT through a power amplifier PA to have the motor MT rotated at a predetermined angle, for example, in the clockwise direction. In this instance, the output pulses of the pulse generator $MM_2$ which are sufficient to drive the motor MT are interposed at intervals of each pulse. Thus, there is no failure in starting the motor MT and it can be avoided such situation that the current is running to flow without causing the motor to drive.

Figure 1:
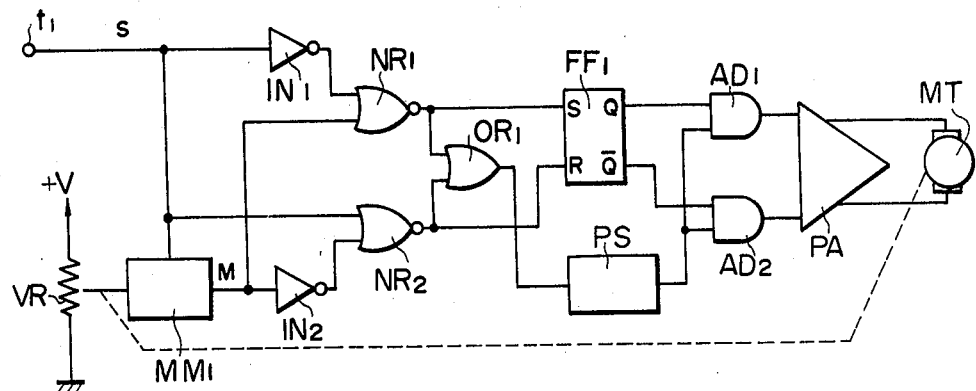
FIG. 1 is a block diagram showing the conventional motor servo circuit.
Figure 2:
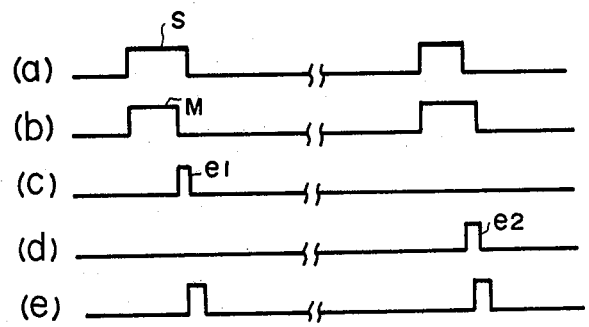
FIG. 2 is a timing chart for explaining the operation of the conventional motor servo circuit.
Figure 3:
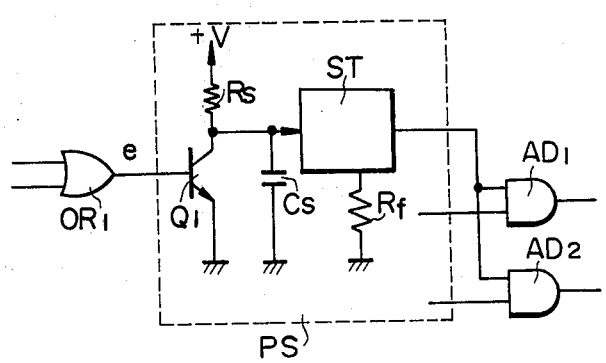
FIG. 3 is a block diagram showing an essential part of the conventional motor servo circuit.
Figure 4:
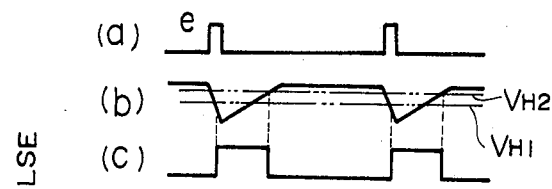
FIG. 4 is a schematic diagram illustrating the operation of the conventional motor servo circuit.
Figure 5:
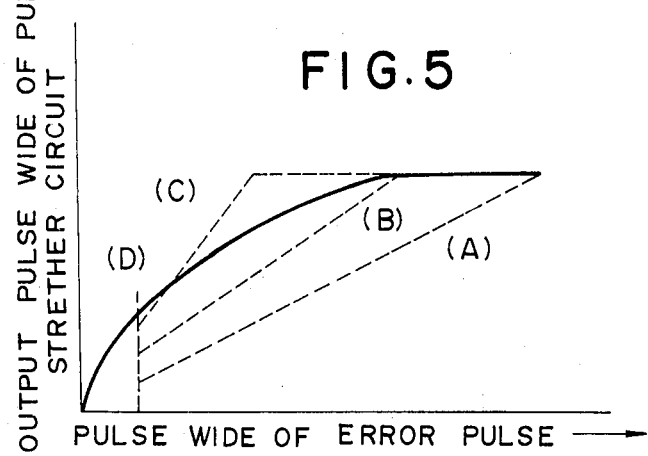
FIG. 5 is a diagram showing characteristics of the conventional motor servo circuit and a motor servo circuit according to the present invention, respectively.

In addition, the volume of the revolution of the motor MT is determined by the output pulse length of the pulse stretcher circuit PS, and the characteristics of the pulse stretcher circuit PS is as shown by the solid line in FIG. 5. Thus, the pulse stretcher circuit is responsive to the minute error pulses. As a result, the resolving power is significantly increased.

Furthermore, the OR circuit $OR_2$ performs the OR-logic with respect to the output pulses of the pulse stretcher circuit PS and the output pulses of the pulse generator $MM_2$. Therefore, when the duration of the pulses fed to the input terminal $t_1$ significantly differs from that of the pulses outputted from the pulse generator MM$_1$ due to a sudden control operation effected by a transmitter station and the length of the output pulses of the pulse stretcher circuit PS is longer than that of the output pulses of the pulse generator MM$_2$, the pulse length fed to the AND circuit AD$_1$ is always regulated by the output pulses of the pulse stretcher circuit PS. Accordingly, in the motor servo circuit of the present invention, the driving characteristics of the motor MT and resolving power for control are significantly improved without damaging the control speed. Thus, when the motor MT is rotated, for example, in the clockwise direction, a slider of variable resistor VR connected to the rotary shaft of the motor MT is rotated in accordance with the rotation of the motor MT, thereby the duration of the output pulses of the pulse generator MM$_1$ is controlled in the direction to follow the pulse length of the input pulses. This control operation continues for several cycles, and when the motor MT is rotated at an angle intended by an operator responding to the pulse width of the input pulses, the pulse width of the input pulses and the output pulses of the pulse generator MM$_1$ will be registered, thereby to stop the generation of the error pulses. Then, one control operation is completed.

On the other hand, when the pulse width of the output pulses of the pulse generator MM$_1$ shown in FIG. 7(b) is larger than that of the input pulses shown in FIG. 7(a), error pulses are generated in a NoR circuit NR$_2$ as shown in FIG. 7(d), which are, in turn, given to the pulse stretcher circuit PS through the OR circuit OR$_1$ so as to reset the flip-flop FF$_1$ and to open an AND circuit AD$_2$.

The error pulses given to the AND circuit AD$_3$ through the OR circuit OR$_1$ make the pulse generator MM$_2$ triggered at every one cycle of the error pulses by the actuation of the binary counter CT$_1$, and pulses as shown in FIG. 7(i) are given to the motor MT through the AND circuit AD$_2$ and drive circuit PA, thereby the motor MT is rotated at a predetermined angle, for instance, in the counterclockwise direction to effect the control.

In this manner, the pulses having the predetermined width formed by the pulse generator MM$_2$ are logically added at every one cycle of the error pulses to improve the driving characteristics of the motor MT without damaging the resolving power of the control. Thus, it can be avoided not to cause the motor to drive while permitting the electric current to flow the motor. This is advantageous for saving the consumption of electric power.

In the above-mentioned embodiment, the output pulses of the pulse generator MM$_2$ are inserted at intervals of each error pulse using the binary counter CT$_1$. It is to be understood that the timing for inserting the output pulses of the pulse generator MM$_2$ may be changed depending upon the characteristics of the motor to be used.

Figure 8:
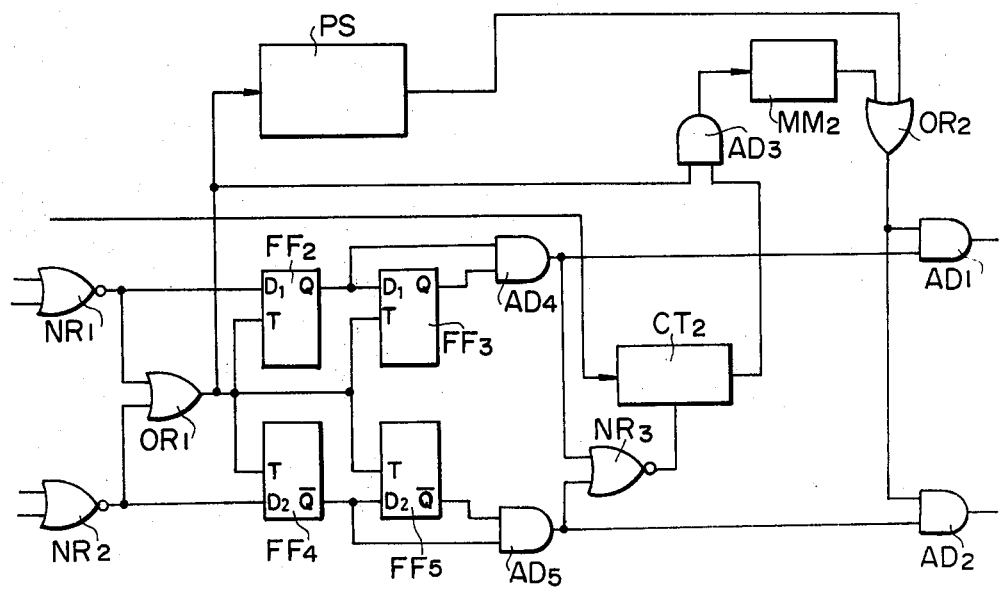
FIG. 8 is a block diagram showing an essential part of motor servo circuit according to another embodiment of the present invention.

FIG. 8 shows another embodiment of the motor servo circuit according to the present invention. In this embodiment, output pulses of a pulse generator MM$_2$ are inserted at every two error pulses for eliminating unstable operation of a motor MT due to a jittering phenomenon caused by external noises or noises in a receiver. In the embodiment shown in FIG. 8, an AND circuit AD$_1$ or AD$_2$ does not open unless at least two error pulses are inputted in succession on either input terminals of an OR circuit OR$_1$. Two D-type flip-flops FF$_2$ and FF$_3$ connected in cascade and for making the error pulses outputted from the OR circuit OR$_1$ clock pulses are provided. The Q outputs of the flip-flops FF$_2$ and FF$_3$ are connected to an AND circuit AD$_4$ for forming a gate signal for the AND circuit AD$_1$. In the same manner, two D-type flip-flops FF$_4$ and FF$_5$ are connected in cascade, and the Q outputs of the flip-flops FF$_4$ and FF$_5$ are connected to an AND circuit AD$_5$ to obtain a gate signal for the AND circuit AD$_2$. As a result, unstable operation of the motor, such as, for example, alternate right and left rotations of the motor due to the jittering phenomenon in the input pulses explained hereinabove, can be eliminated.

Figure 9:
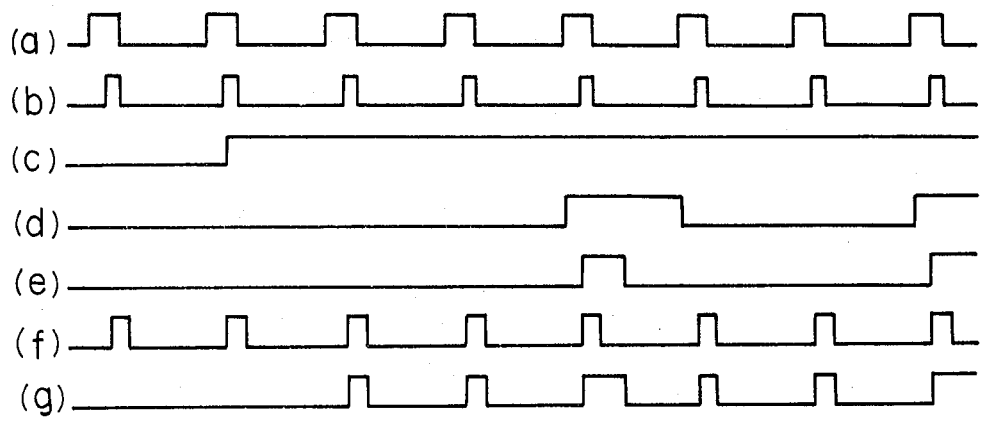
FIG. 9 is a timing chart for explaining the operation of the motor servo circuit shown in FIG. 8.

In the embodiment shown in FIG. 8, a ternary counter CT$_2$ is actuated by input pulses shown in FIG. 9(a). The ternary counter CT$_2$ is supplied with an output of NoR circuit NR$_3$ to which the outputs of the AND circuits AD$_4$ and AD$_5$ are inputted, and is actuated only when a signal "1" is outputted from at least either the AND circuits AD$_4$ or AD$_5$, namely, either one of the AND circuits AD$_1$ and AD$_2$ is open.

In this embodiment, if error pulses are generated in succession in a NoR circuit NR$_1$, the flip-flops FF$_2$ and FF$_3$ are set by the second error pulse of the consecutive error pulses, and the output of the AND circuit AD$_4$ goes to a signal "1" as shown in FIG. 9(c), which permits the resetting state of the ternary counter CT$_2$ to release. The ternary counter CT$_2$ thereafter generates a signal "1" at its output terminal as shown in FIG. 9(d) upon arrival of every three input pulses shown in FIG. 9(a). The ternary counter CT$_2$ causes an AND circuit AD$_3$ to open, and the error pulses are given to the pulse generator MM$_2$ as a trigger pulse through the AND circuit AD$_3$. Then, a single pulse as shown In FIG. 9(e) is outputted from the pulse generator MM$_2$.

The pulses outputted from the pulse generator MM$_2$ and output pulses of pulse stretcher circuit PS shown in FIG. 9(f) which are obtained by stretching the pulse width of the error pulses outputted from the OR circuit OR$_1$ are logically added by means of an OR circuit OR$_2$. Then, a signal consisting of the output pulses of the pulse stretcher circuit PS into which the output pulses of the pulse generator MM$_2$ are inserted at every two output pulses of the pulse stretcher circuit PS as shown in FIG. 9(g) is given to a driving circuit (not shown) through the AND circuit AD$_1$, thereby to rotate the motor, for example, in the clockwise direction.

When the error pulses are continuously given to a NoR circuit NR$_2$, a signal consisting of the output pulses of the pulse stretcher circuit PS into which the output pulses of the pulse generator MM$_2$ are inserted at every two output pulses of the pulse stretcher circuit is given to the output terminal of the AND circuit AD$_2$ in the same manner as explained hereinabove.

In this manner, the pulses having the pulse width which is sufficient for driving the motor are inserted into the output pulses of the pulse stretcher circuit at intervals of the predetermined number of the output pulses. Therefore, the driving characteristics of the motors are remarkably improved. However, the width of the output pulses of the pulse stretcher circuit PS is not controlled in any manner whatsoever and the pulse stretcher circuit is responsive to error pulses having the narrow pulse width. Thus, the resolving power is significantly improved.

In the servo mechanisms of this type, the motor and the control circuits are generally driven by the same power source to reduce the size and weight of the device. Accordingly, when using a battery as a power source which is inferior in stability of its output voltage or decreasing charging capacity of a rechargeable battery, peak value of pulses fed to the motor MT is reduced, which results in decreases in the average electric power and also the revolution velocity of the motor, and the control action is remarkably deteriorated. This problem can be solved by giving the output pulse width of the pulse generator $MM_2$ to a dependency of power supply voltage.

Figure 10:
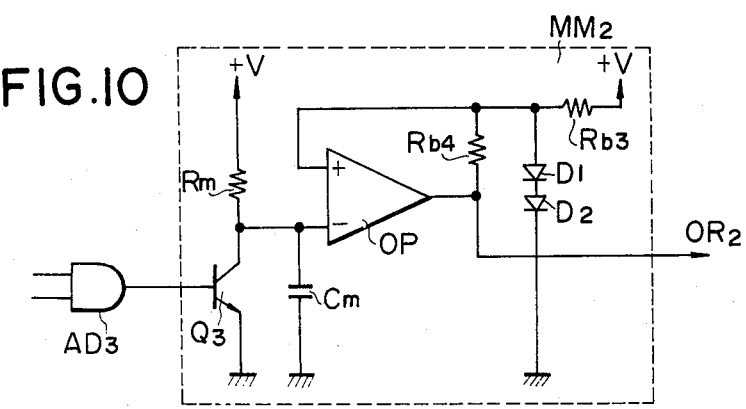
FIG. 10 is a block diagram showing an essential part of motor servo circuit according to another embodiment of the present invention.

FIG. 10 shows a pulse generator $MM_2$ according to another embodiment of the present invention which is intended to eliminate the above-mentioned disadvantage.

The pulse generator $MM_2$ shown in FIG. 10 is basically made of an operational amplifier OP, an invertion input terminal (−) of which is fed to a terminal voltage of capacitor Cm in a time constant circuit consisting of a resistor Rm and the capacitor Cm and a non-inversion input terminal (+) of which is fed to a terminal voltage of diodes $D_1$ and $D_2$ applying a forward current through a resistor $Rb_3$, thereby to be clamped at a predetermined potential. In addition, a positive feedback outputted from an output terminal of the operational amplifier OP is applied to the non-inversion input terminal (+) through a resistor $Rb_4$, and a transistor $Q_3$ for forming a discharge circuit is provided in parallel with the capacitor Cm.

Figure 11:
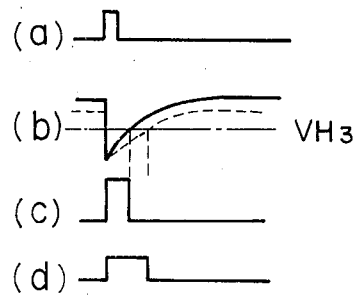
FIG. 11 is a timing chart for explaining the operation of the motor servo circuit shown in FIG. 10.

When an error pulse shown in FIG. 11(a) is given to the transistor $Q_3$ through the AND circuit $Ad_3$ shown in FIG. 6 or 8, the transistor is switched on, thereby to discharge electric charge stored in the capacitor Cm and to invert the output of the operational amplifier OP as shown in FIG. 11(c). When the error pulse is stopped generating, the transistor $Q_3$ is switched off and the capacitor Cm is electrically charged according to the time constant CmRm determined by the resistor Rm and the capacitor Cm as shown by the solid line in FIG. 11(b).

When the charging voltage exceeds the reference voltage $VH_3$ which is established by the diodes $D_1$ and $D_2$ connected to the non-inversion input terminal (+) of the operational amplifier OP, the output of the operational amplifier OP is again inverted as shown in FIG. 11(c), and a pulse having width which is determined by the time constant CmRm as shown in FIG. 11(c) is obtained as the output of the operational amplifier OP.

Figure 12:
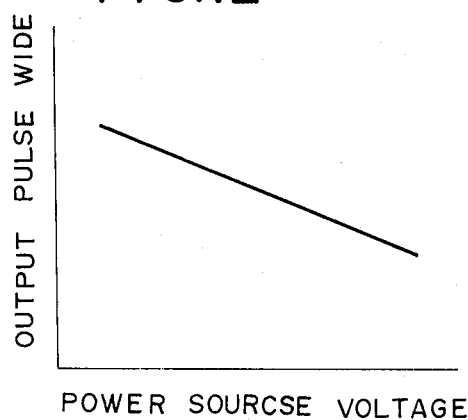
FIG. 12 is a diagram for explaining the operation of the motor servo circuit shown in FIG. 10.

When decreasing the power supply voltage V due to the current flow in the motor MT, the charging time constant with respect to the capacitor Cm remains the same as shown by the broken line in FIG. 11(b). However, the electric charging curve changes as shown by the broken line in FIG. 11(b) because of the decrease in the voltage. To the contrary, the reference voltage $VH_3$ established by the diodes $D_1$ and $D_2$ remains constant irrespective to the change of the power supply voltage (+V). Therefore, when the power supply voltage (+V) is decreased, the time requiring for reaching the terminal voltage of the capacitor Cm to the reference voltage $VH_3$ is delayed as shown by the broken line in FIG. 11(b), and the width of the output pulse outputted from the operational amplifier OP is eventually widened as shown in FIG. 11(d). As is apparent from the foregoing explanation, the width of the output pulses of the pulse generator $MM_2$ depends upon the power supply voltage (+V) and the pulse width will be broader as the decrease of the power supply voltage as shown in FIG. 12. Accordingly, the average electric power supplied to the motor MT remains almost constant irrespective of the decrease in the power supply voltage, which makes it possible to effect the control without decreasing the running speed of the motor MT.

As explained hereinabove, the motor servo circuit according to the present invention generates the pulse having the pulse width which is sufficient to start the motor at intervals of the predetermined number of error pulses, and the pulses are fed to the motor together with the error pulses, the pulse width of which is stretched by the pulse stretcher circuit.

Therefore, the driving characteristics of the motor are significantly improved. The motor servo circuit according to the present invention is free from the starting failure or the flow of the reactive current into the motor which does not cause the motor to drive. Thus, the consumption of the electric power can be remarkably decreased. Furthermore, the width of the minimum output pulses fed to the motor, namely, the width of the output pulses of the pulse stretcher circuit, is not regulated in any manner whatsoever. Accordingly, the motor can be controlled by the error pulses having extremely narrow pulse width. As a result, the resolving power and the control precision are remarkably improved.

Obviously, many modifications and variations of the present invention are possible in the light of the above teachings. It is therefore to be understood that within the scope of the appended claims, the invention may be practiced otherwise than as specifically described.

What is claimed as new and desired to be secured by Letters Patent of the United States is:

1. A motor servo circuit comprising:
    a first pulse generator for generating pulses having a pulse width adjusted by external signals and synchronized with input pulses;
    a pulse width comparator for comparing output pulses from the first generator with the pulse width of the input pulses and generating pulses having a pulse width corresponding to a difference in the pulse width of both of these pulses when the pulse widths are different;
    a pulse width stretcher for stretching an output of the pulse width comparator;
    a second pulse generator for generating pulses having a predetermined pulse width at intervals of the generation of predetermined number of the output pulses of the pulse width comparator;
    an adder for performing an OR of the output pulses of the pulse width stretcher and the second pulse generator; and
    a motor driven by the output of the adder for adjusting the output pulse width of the first pulse generator in accordance with the rotation angle of the motor.

2. The motor servo circuit as defined in claim 1 wherein the second pulse generator generates the output pulses, the width of which is regulated in response to a minimum pulse width required for driving the motor.

3. The motor servo circuit as defined in claim 1 wherein the second pulse generator generates the output pulses, the width of which is regulated based upon the power supply voltage.

* * * * *